US012759341B2

(12) United States Patent
Wang

(10) Patent No.: US 12,759,341 B2
(45) Date of Patent: Oct. 13, 2026

(54) CAR WHEEL RIM DECORATION COVER FASTENING STRUCTURE

(71) Applicant: SUPERIOR CROWN MATERIAL CO., LTD., Tainan City (TW)

(72) Inventor: Ming-Fang Wang, Tainan City (TW)

(73) Assignee: SUPERIOR CROWN MATERIAL CO., LTD., Tainan City (TW)

( * ) Notice: Subject to any disclaimer, the term of this patent is extended or adjusted under 35 U.S.C. 154(b) by 237 days.

(21) Appl. No.: 18/672,064

(22) Filed: May 23, 2024

(65) Prior Publication Data

US 2025/0360752 A1 Nov. 27, 2025

(51) Int. Cl.
*B60B 7/06* (2006.01)
*B60B 7/12* (2006.01)

(52) U.S. Cl.
CPC ................ *B60B 7/066* (2013.01); *B60B 7/12* (2013.01)

(58) Field of Classification Search
CPC ........... B60B 7/04; B60B 7/063; B60B 7/066; B60B 7/08; B60B 7/12
See application file for complete search history.

(56) References Cited

U.S. PATENT DOCUMENTS 4,547,021 A * 10/1985 Abbate Daga .......... B60B 7/068 301/108.3
7,204,562 B2 * 4/2007 Gerard .................. B60B 7/0013 301/37.11
12,115,815 B2 * 10/2024 Wang .................... B60B 7/0013
2004/0145236 A1 * 7/2004 Wang ........................ B60B 7/18 301/37.101
2007/0096545 A1 * 5/2007 Wang ...................... B60B 7/065 301/37.42

FOREIGN PATENT DOCUMENTS

CN 108909351 A * 11/2018 ........... B60B 7/0013
EP 0185102 A1 * 6/1986 ............... B60B 7/04
EP 1736325 A2 * 12/2006 ............... B60B 7/12
FR 3019092 A1 * 10/2015 ............. B60B 7/066
FR 3102711 A1 * 5/2021 ............. B60B 7/066

* cited by examiner

*Primary Examiner* — Adam D Rogers

(74) *Attorney, Agent, or Firm* — LANWAY IPR SERVICES; Chun-Ming Shih

(57) ABSTRACT

A wheel rim assembly includes a wheel rim, a decoration cover, and a locking cap. The wheel rim has a rim body, a first central hole, and a first flange. The decoration cover has a cover body, a second central hole, and a second flange. The cover body is assembled on the rim body. The second central hole aligns with the first central hole. The locking cap includes a cap body and an elastic ring. The cap body has multiple insertion shafts passing through the second central hole and the first central hole. Each of the insertion shafts has an outer face formed with a locking hook and an inner face provided with at least one positioning groove. The locking hook is locked on the first flange. The elastic ring is mounted in the at least one positioning groove.

3 Claims, 5 Drawing Sheets

CAR WHEEL RIM DECORATION COVER FASTENING STRUCTURE

BACKGROUND OF THE INVENTION

Field of the Invention

The present invention relates to a wheel rim assembly and, more particularly, to a car wheel rim decoration cover fastening structure.

Description of the Related Art

A conventional wheel rim assembly comprises a wheel rim and a decoration cover mounted on the wheel rim. The decoration cover is used to enhance the aesthetic quality of the wheel rim. The decoration cover is provided with multiple locking blocks locked onto the wheel rim to attach the decoration cover to the wheel rim. However, the decoration cover is not securely attached to the wheel rim by the locking blocks so that the decoration cover is easily detached from the wheel rim during a long-term utilization, thereby decreasing the driving safety.

BRIEF SUMMARY OF THE INVENTION

The primary objective of the present invention is to provide a combination structure of a wheel rim, a decoration cover and a locking cap to enhance the fixation of the decoration cover.

In accordance with the present invention, there is provided a wheel rim assembly comprising a wheel rim, a decoration cover, and a locking cap. The wheel rim has a rim body. The rim body has a center provided with a first central hole penetrating the rim body. The first central hole has an inside formed with a first flange protruding therefrom. The decoration cover has a cover body. The cover body has a center provided with a second central hole penetrating the cover body. The second central hole has an inside formed with a second flange protruding therefrom. The cover body is assembled on the rim body. The second central hole aligns with the first central hole. The locking cap includes a cap body and an elastic ring. The cap body has a face formed with multiple insertion shafts protruding therefrom. The insertion shafts are arranged annularly. A predetermined distance is defined between each of the insertion shafts and an edge of the cap body. Each of the insertion shafts has an outer face formed with a locking hook. Each of the insertion shafts has an inner face provided with at least one annular positioning groove. The elastic ring is mounted in the at least one positioning groove of each of the insertion shafts simultaneously. Each of the insertion shafts passes through the second central hole and the first central hole simultaneously. The locking hook of each of the insertion shafts is locked on the first flange simultaneously. The cap body rests on the second flange.

According to the primary advantages of the present invention, the decoration cover is affixed to the wheel rim stably after the locking cap is locked on the wheel rim and presses the decoration cover, so that even when the decoration cover is unlocked from the wheel rim during a long-term utilization, the decoration cover is still retained by the locking cap which prevents the decoration cover from being detached from the wheel rim to enhance the driving safety.

BRIEF DESCRIPTION OF THE SEVERAL VIEWS OF THE DRAWING(S)

DETAILED DESCRIPTION OF THE INVENTION

Figure 1:
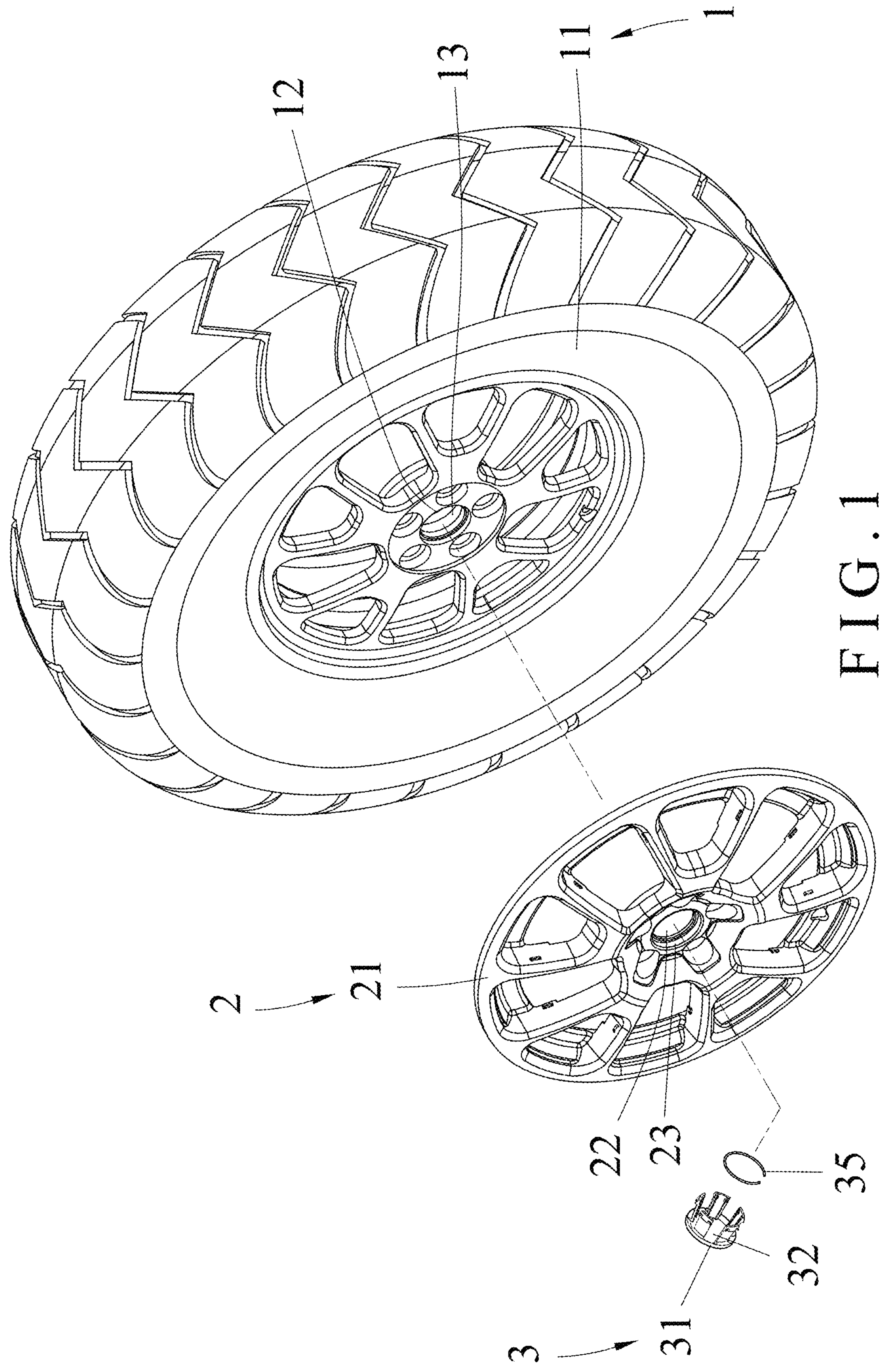
FIG. 1 is an exploded perspective view of a wheel rim assembly in accordance with the preferred embodiment of the present invention.
Figure 2:
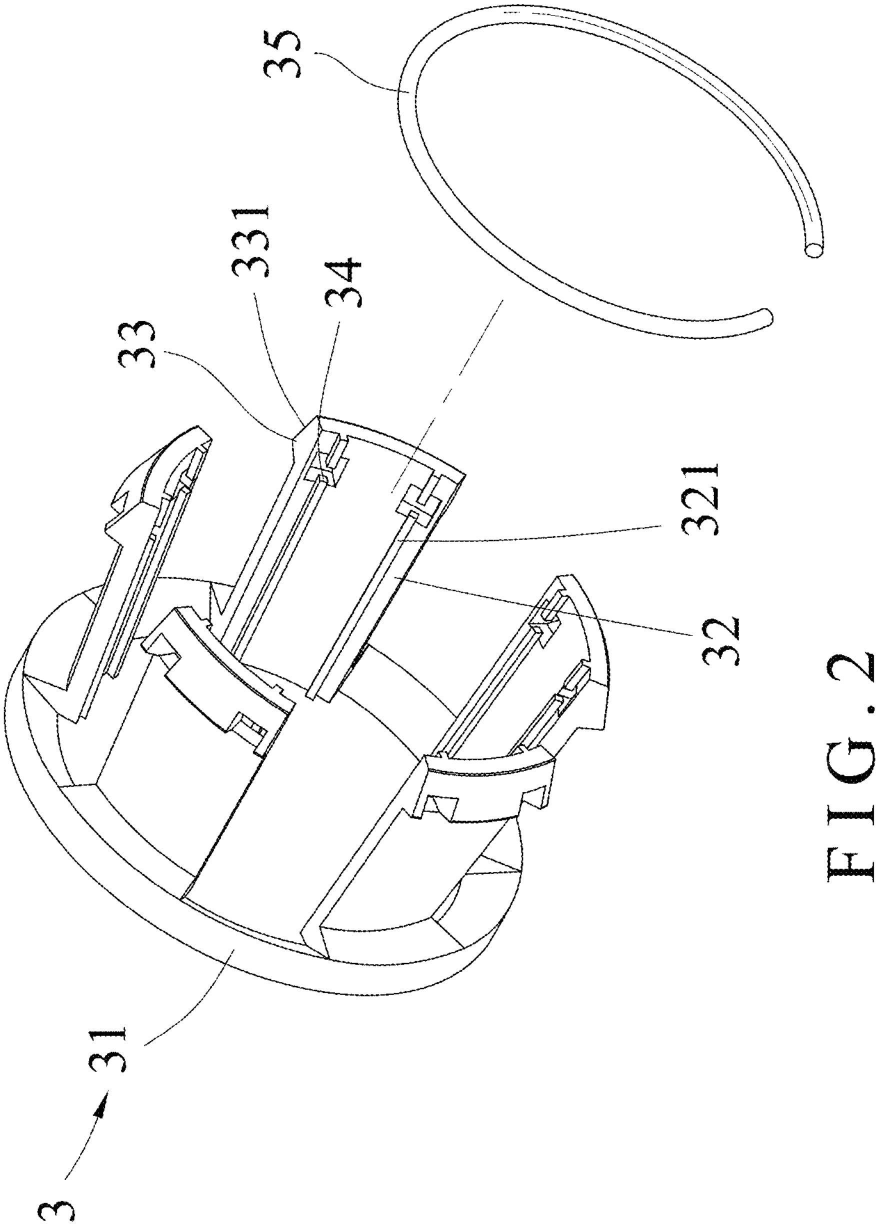
FIG. 2 is an exploded perspective view of a locking cap of the wheel rim assembly in accordance with the preferred embodiment of the present invention.
Figure 3:
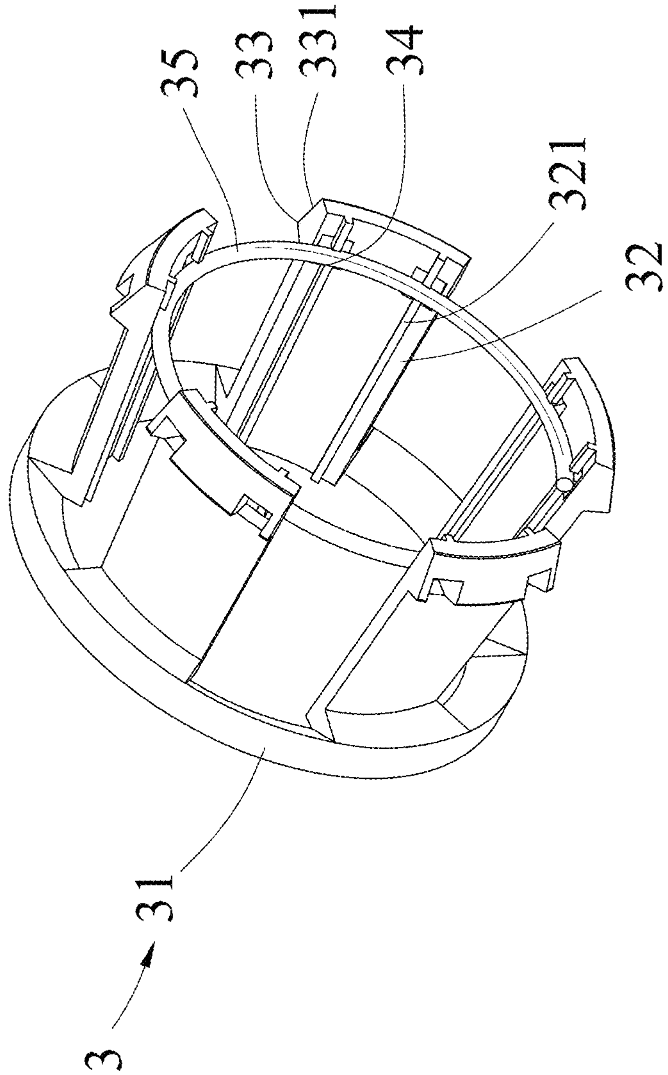
FIG. 3 is a perspective assembly view of the locking cap of the wheel rim assembly as shown in FIG. 2.
Figure 4:
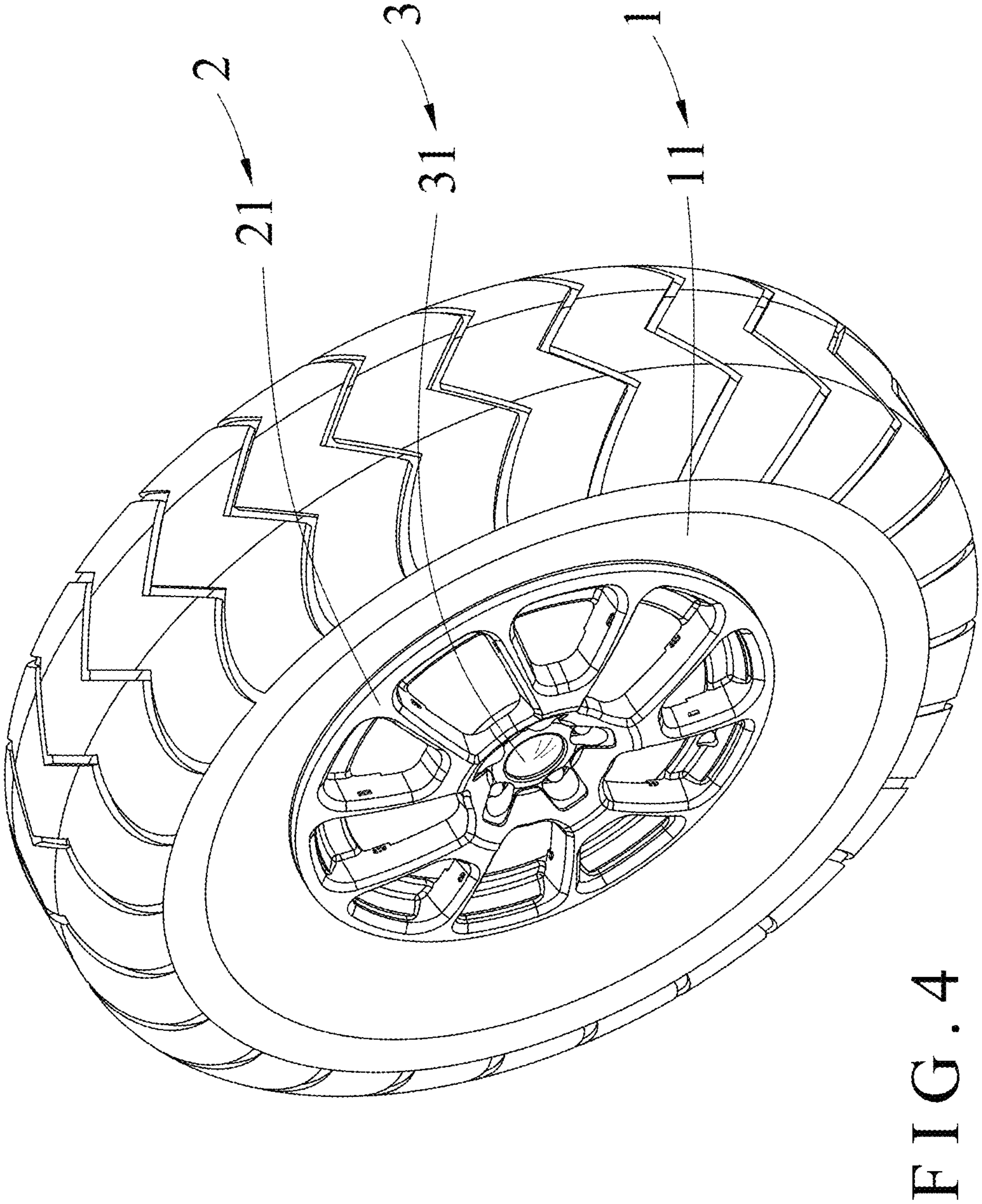
FIG. 4 is a perspective assembly view of the wheel rim assembly as shown in FIG. 1.
Figure 5:
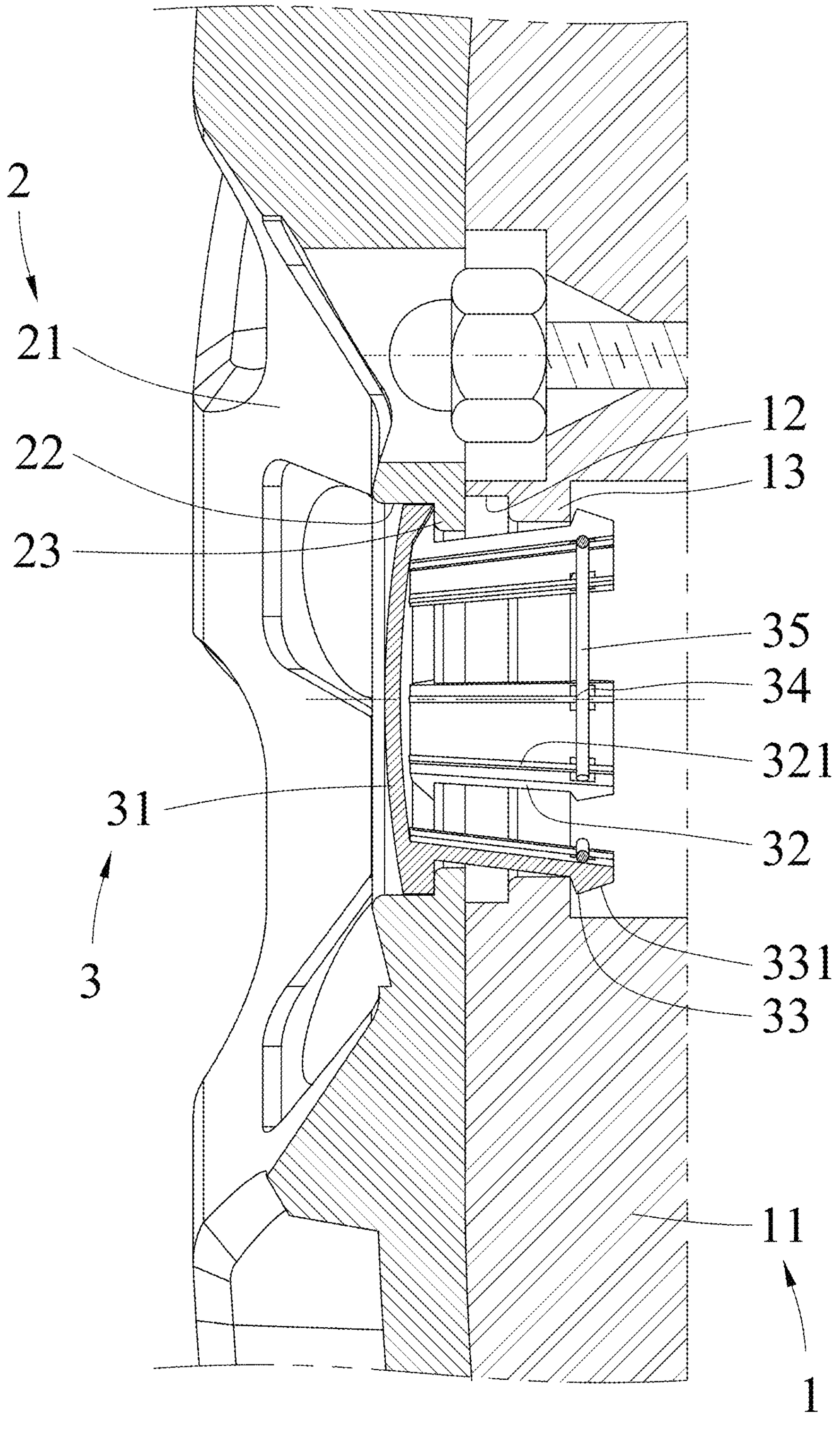
FIG. 5 is a cross-sectional view of the wheel rim assembly as shown in FIG. 4.

Referring to FIGS. 1-5, a wheel rim assembly in accordance with the preferred embodiment of the present invention comprises a wheel rim 1, a decoration cover 2, and a locking cap 3.

The wheel rim 1 has a rim body 11. The rim body 11 has a center provided with a first central hole 12 penetrating the rim body 11. The first central hole 12 has an inside formed with a first flange 13 protruding therefrom.

The decoration cover 2 has a cover body 21. The cover body 21 has a center provided with a second central hole 22 penetrating the cover body 21. The second central hole 22 has an inside formed with a second flange 23 protruding therefrom. The cover body 21 is assembled on the rim body 11. The second central hole 22 aligns with the first central hole 12.

The locking cap 3 includes a cap body 31 and an elastic ring 35. The cap body 31 has a face formed with multiple insertion shafts 32 protruding therefrom. The insertion shafts 32 are arranged annularly. A predetermined distance is defined between each of the insertion shafts 32 and an edge of the cap body 31. Each of the insertion shafts 32 has an outer face formed with a locking hook 33. Each of the insertion shafts 32 has an inner face provided with at least one annular positioning groove 34. The elastic ring 35 is mounted in the at least one positioning groove 34 of each of the insertion shafts 32 simultaneously. Each of the insertion shafts 32 passes through the second central hole 22 and the first central hole 12 simultaneously. The locking hook 33 of each of the insertion shafts 32 is locked on the first flange 13 simultaneously. The cap body 31 rests on the second flange 23.

In the preferred embodiment of the present invention, the inner face of each of the insertion shafts 32 is formed with at least one rib 321 protruding therefrom, and the at least one positioning groove 34 is formed in the at least one rib 321.

In the preferred embodiment of the present invention, the locking hook 33 of each of the insertion shafts 32 has an oblique guide face 331.

In the preferred embodiment of the present invention, the elastic ring 35 is made of metal and has a C-shaped annular profile.

In practice, the elastic ring 35 is mounted in the inner face of each of the insertion shafts 32, so that the locking hook 33 of each of the insertion shafts 32 is locked on the first flange 13 steadily and firmly. In addition, the locking cap 3 is locked on the wheel rim 1 and presses the decoration cover 2, to prevent the decoration cover 2 from being detached from the wheel rim 1 to enhance the safety of use.

Further, the oblique guide face 331 of the locking hook 33 of each of the insertion shafts 32 slips on the second flange 23 and the first flange 13 during assembly, so that the locking hook 33 of each of the insertion shafts 32 is locked on the first flange 13 easily and quickly.

Accordingly, the decoration cover 2 is affixed to the wheel rim 1 stably after the locking cap 3 is locked on the wheel rim 1 and presses the decoration cover 2, so that even when the decoration cover 2 is unlocked from the wheel rim 1 during a long-term utilization, the decoration cover 2 is still retained by the locking cap 3 which prevents the decoration cover 2 from being detached from the wheel rim 1 to enhance the driving safety.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A wheel rim assembly comprising:

a wheel rim, a decoration cover, and a locking cap; wherein:

the wheel rim has a rim body;

the rim body has a center provided with a first central hole penetrating the rim body;

the first central hole has an inside formed with a first flange protruding therefrom;

the decoration cover has a cover body;

the cover body has a center provided with a second central hole penetrating the cover body;

the second central hole has an inside formed with a second flange protruding therefrom;

the cover body is assembled on the rim body;

the second central hole aligns with the first central hole;

the locking cap includes a cap body and an elastic ring;

the cap body has a face formed with multiple insertion shafts protruding therefrom;

the insertion shafts are arranged annularly;

a predetermined distance is defined between each of the insertion shafts and an edge of the cap body;

each of the insertion shafts has an outer face formed with a locking hook;

each of the insertion shafts has an inner face provided with at least one annular positioning groove;

the elastic ring is mounted in the at least one positioning groove of each of the insertion shafts simultaneously;

the inner face of each of the insertion shafts is formed with at least one rib protruding therefrom;

the at least one positioning groove is formed in the at least one rib;

each of the insertion shafts passes through the second central hole and the first central hole simultaneously;

the locking hook of each of the insertion shafts is locked on the first flange simultaneously; and the cap body rests on the second flange.

2. The wheel rim assembly as claimed in claim 1, wherein the locking hook of each of the insertion shafts has an oblique guide face.

3. The wheel rim assembly as claimed in claim 1, wherein the elastic ring is made of metal and has a C-shaped annular profile.

* * * * *